United States Patent [19]

Nicolas

[11] Patent Number: 4,794,546
[45] Date of Patent: Dec. 27, 1988

[54] METHOD OF AND APPARATUS FOR SCANNING OBJECTS BY MEANS OF ULTRASOUND ECHOGRAPHY

[75] Inventor: Jean-Marie Nicolas, Paris, France

[73] Assignee: U.S. Philips Corporation, New York, N.Y.

[21] Appl. No.: 843,905

[22] Filed: Mar. 25, 1986

[30] Foreign Application Priority Data

Mar. 29, 1985 [FR] France .................................. 85 04822

[51] Int. Cl.4 ......................... G01N 29/04; G01N 9/24
[52] U.S. Cl. ...................................... 364/507; 73/602; 73/622; 73/624
[58] Field of Search ................................. 364/506–508, 364/552, 555; 73/624, 625, 627–629, 632, 633, 602, 622

[56] References Cited

U.S. PATENT DOCUMENTS

| 3,996,791 | 12/1976 | Niklas et al. | 364/507 |
| 4,274,288 | 6/1981 | Tittmann et al. | 364/507 |
| 4,497,210 | 2/1985 | Uchida et al. | 73/628 |
| 4,552,020 | 11/1985 | Auphan | 73/625 |
| 4,611,494 | 9/1986 | Uchiyama | 73/628 |
| 4,615,217 | 10/1986 | Koike et al. | 73/624 |

Primary Examiner—Parshotam S. Lall
Assistant Examiner—Brian M. Mattson
Attorney, Agent, or Firm—Jack E. Haken

[57] ABSTRACT

A method and device of scanning objects by means of ultrasound echography by repeated transmission of ultrasound signals and the reception of the ultrasound echoes includes the following operations:

(a) storing an echographic line in a memory;
(b) determining the ratio of the power spectra for two distinct observation depths, including correction for the effects of the diffraction;
(c) storing in a memory and/or displaying the frequency-dependency of the scatter function of the object examined;
(d) repeating the proceding operations for two other observation depths which correspond to resepctive boundaries of homogeneous zones, and for other echographic lines.

8 Claims, 1 Drawing Sheet

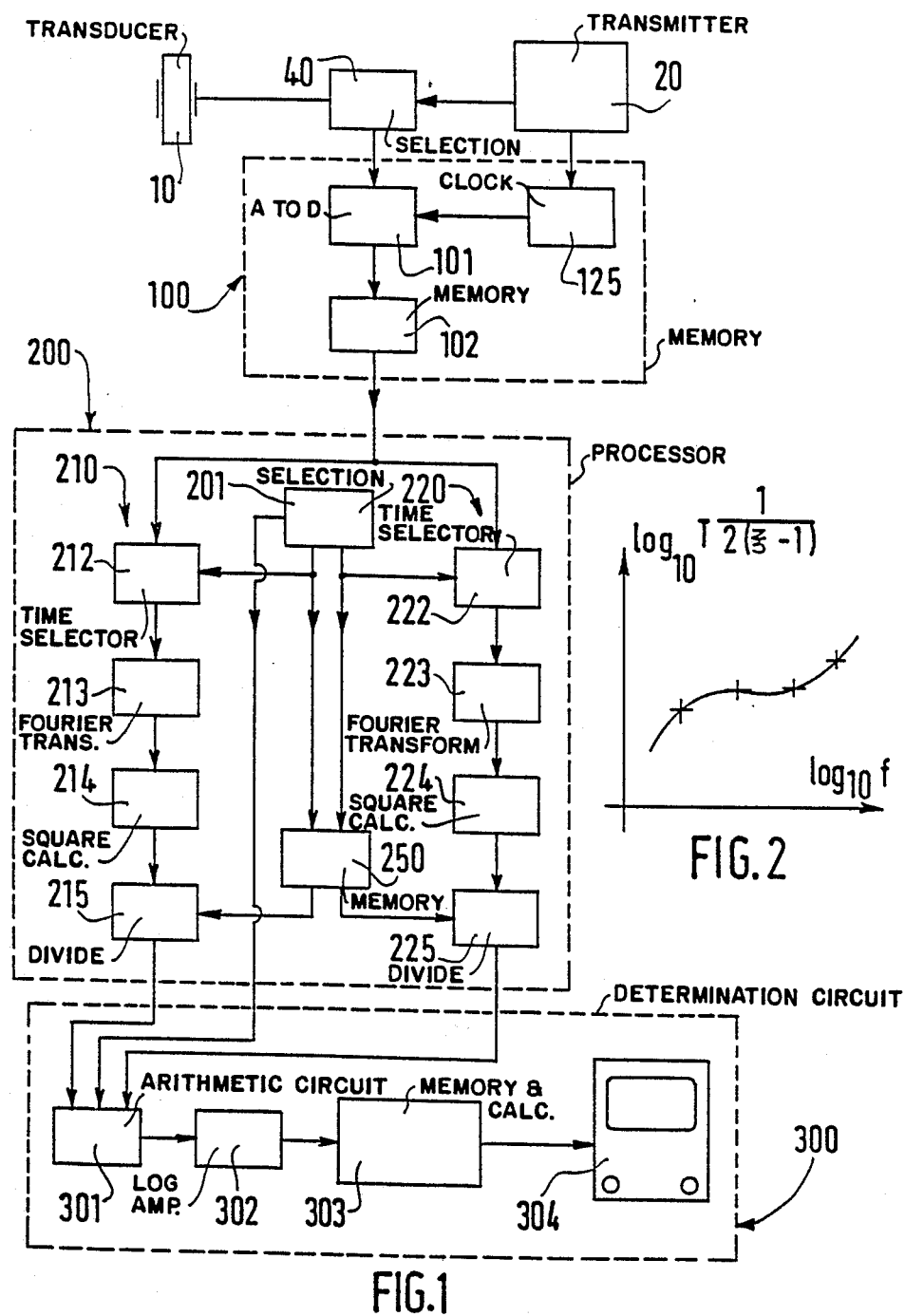

METHOD OF AND APPARATUS FOR SCANNING OBJECTS BY MEANS OF ULTRASOUND ECHOGRAPHY

The invention relates to a method of scanning objects by means of ultrasound echography, involving the repeated transmission of ultrasound signals by means of at least one ultrasound transducer and the reception of the ultrasound echoes which correspond to the principal obstacles encountered by the transmitted signals in their propagation direction.

BACKGROUND OF THE INVENTION

The invention also relates to a device for performing such a method, including at least one ultrasound transducer which is connected to a transmitter stage for the repeated transmission of ultrasound signals and to a receiver stage for receiving the ultrasound echoes which correspond to the principal obstacles encountered by the transmitted signals in their propagation direction.

A device of this kind can be used, for example for the non-destructive testing of materials and for the scanning of biological tissues.

A conventional ultrasound echogram is obtained by detection of the envelope of the echoes which are produced in the tissues by means of an ultrasound beam. Because the most important echoes arise at the boundaries of the organs, these echograms show mainly the contours of these organs. All information as regards the phase (and hence the frequency) of the signal is then lost. This information can be associated with appropriate indicators for some indistinct diseases which are difficult to diagnose by means of other means.

SUMMARY OF THE INVENTION

It is an object of the invention to provide a method of examining objects by means of ultrasound echography which enables determination of the frequency-dependency of the scatter function of the object examined.

To achieve this, the method in accordance with the invention is characterized in that it includes the following operation:

(a) storing an echographic line in a memory;

(b) determining the ratio of the power spectra for two separate observation depths, including correction of the diffraction effect;

(c) storing in a memory and/or displaying the frequency-dependency of the scatter function of the object examined;

(d) repeating the foregoing operations for two other observation depths which correspond to respective boundaries of homogeneous zones, and for other echographic lines.

This method enables a quantitative determination of the scatter function of the object examined so that the object can be characterized and the pathological condition thereof can be determined.

It is a further object of the invention to provide a device for scanning objects by means of ultrasound echography which is suitable for performing the method in accordance with the invention.

To achieve this, the device in accordance with the invention is characterized in that said receiver stage includes:

(A) a memory stage for the storage of an echographic line, said stage being composed of an analog-to-digital converter and a digital memory;

(B) a determination stage for determining the ratio of the power spectra for two separate observation depths, said stage including two parallel-connected channels, each of which successively includes: a multiplier circuit for multiplying the output signal of the memory stage for the storage of an echographic line by the output signal of a selection circuit for selecting the observation depth; an arithmetic circuit for calculating the Fourier transform; an arithmetic circuit for calculating the square of the modulus, and a correction circuit for correcting the diffraction;

(C) a stage for storing in a memory and/or displaying the scatter function of the object examined, including:

(a) an arithmetic circuit for calculating the formula $$T = \left(\frac{a_1}{a_2}\right)^{2(\xi-1)} \cdot (f^{b_1-b_2})^{2(\xi-1)}$$

in which $a_1$, $a_2$, $b_1$, $b_2$ are the values of the coefficient a and the exponent b in the general formula $U(f) = af^b$ of said scatter function for the object scanned and a reference object, respectively, in which the frequency dependency of the scatter function is known and $\epsilon$ is the ratio of the two observation depths;

(b) a logarithmic amplifier, and (c) an arithmetic circuit for storing the scatter function of the object scanned in a memory or for displaying it on a display device.

The invention will be described in detail hereinafter, by way of example, with reference to the accompanying diagrammatic drawings; therein:

FIG. 1 shows an embodiment of the device in accordance with the invention; and

FIG. 2 shows a curve representing the results of the operations performed by the arithmetic circuit of the device shown in FIG. 1.

The analysis of the frequency-dependency of the scatter function of the object examined is performed by comparison of mean power spectra. It is known that the formula for a mean power spectrum can be expressed as follows for a time slot W at the instant $\tau$:

$$S_w(\tau,f) = |G(f)|^2 \cdot |U(f)|^2 \cdot D(\tau,f) \cdot e^{-2\alpha(f)c\tau} \qquad (1)$$

In this formula $|G(f)|^2$ depends only on the transmitted signal and the acoustic and electrical properties of the transducer;

$D(\tau,f)$ is the filter effect caused by the diffraction;

$\alpha(f)$ and c denote the attenuation and the velocity, respectively, of the ultrasound waves in the object examined;

$U(f)$ is the scatter function of the object.

For the following description it will be assumed that a reference object is available for which the frequency-dependency of the scatter function is known. By using the same ultrasound transducer and a constant transmitted signal, the equation providing the quotient of the power spectra associated with the scanned object and the reference object, that is to say:

$$R(\tau, f) = \frac{|G_1(f)|^2 \cdot D_1(\tau, f) \cdot |U_1(f)|^2 \cdot \exp^{-2\alpha_1(f)c\tau}}{|G_2(f)|^2 \cdot D_2(\tau, f) \cdot |U_2(f)|^2 \cdot \exp^{-2\alpha_2(f)c\tau}} \quad (2)$$

can be simplified to $$R(\tau, f) = \frac{|U_1(f)|^2}{|U_2(f)|^2} \exp^{-2(\alpha_1(f)-\alpha_2(f))\cdot c\tau} \quad (3)$$

It has also been assumed that $$U_1(f) = a_1 f^{b_1} \quad (4)$$

$$U_2(f) = a_2 f^{b_2} \quad (5)$$

It follows therefrom that:

$$R(\alpha, f) = \left(\frac{a_1}{a_2}\right)^2 \cdot (f^{b_1-b_2})^2 \cdot \exp^{-2(\alpha_1(f)-\alpha_2(f))\cdot c\tau} \quad (6)$$

Now it is no longer necessary to know the laws governing the attenuation in the objects, because the quotient R is calculated for two depths which correspond to two transit times $\tau_A$ and $\tau_B$, the object scanned being homogeneous in this slice of depths:

$$R(\tau_A, f) = \left(\frac{a_1}{a_2}\right)^2 \cdot (f^{b_1-b_2})^2 \cdot \exp^{-2(\alpha_1(f)-\alpha_2(f))\cdot c\tau_A} \quad (7)$$

$$R(\tau_B, f) = \left(\frac{a_1}{a_2}\right)^2 \cdot (f^{b_1-b_2})^2 \cdot \exp^{-2(\alpha_1(f)-\alpha_2(f))\cdot c\tau_B} \quad (8)$$

Moreover, it is assumed that $\tau_B = \tau_A$, so that the equation (9) can be determined:

$$T(f, \tau_A, \tau_B) = \frac{|R(\tau_A, f)|^\epsilon}{R(\tau_B, f)} = \left(\frac{a_1}{a_2}\right)^{2(\epsilon-1)} \cdot (f^{b_1-b_2})^{2(\epsilon-1)} \quad (9)$$

It follows therefrom that:

$$f^{b_1-b_2} = \frac{a_2}{a_1} \cdot T(f) \left(\frac{1}{2(\epsilon-1)}\right) \quad (10)$$

$$f^{b_1-b_2} = K \cdot T(f)^{\frac{1}{2(\epsilon-1)}} \quad (11)$$

Because the right-hand term of the equation (11) can be determined by means of the method and the device in accordance with the invention, the frequency-dependency of the scatter function of the object scanned, that is to say the coefficient $b_1$, can now be determined.

The frequency-dependency of the scatter function can thus be determined by performing the method in accordance with the invention by means of the device shown in FIG. 1. The present embodiment of the device includes a single probe which constitutes the carrier for an ultrasound transducer 10 and which is suitable for obtaining A-type echograms of objects such as biological tissues. It will be apparent that the invention can used in exactly the same way when instead of a single line a complete flat slice of the tissue is scanned, either by means of a manually displaceable probe or a probe with so-called sectorial mechanical angular displacement, connected to a radar-type display device, or by means of a linear array of p ultrasound transducers which define a corresponding number (p) of parallel scanning directions in the tissues examined, said array being connected to the switching circuit for successively switching over the echo processing device to a respective active transducer or group of transducers, or by means of an array of transducers with so-called sectorial electronic scanning, the latter array also being connected to a network of delay lines or phase shifters.

The transducer 10 is connected on the one side to a transmitter stage 20 which serves for the repeated transmission of ultrasound signals by the transducer in an arbitrary scanning direction through the tissues to be examined, and on the other side a receiver stage which serves to process the ultrasound echoes received by the transducer which correspond to the principal obstacles encountered by the transmitter signals in their propagation directions (the situation of these obstacles is defined in the echograms by the echoes of high amplitude which represent the boundaries between the tissues for which the difference factors for the ultrasound attenuation are to be determined). This connection is generally established via a selection circuit 40 which ensures that either exclusively the transmitter stage or exclusively the receiver stage is connected to the transducer; a selection circuit of this kind is mentioned, for example in U.S. Pat. No. 4,139,834. The selection circuit 40 prevents the transmitted signal from being affected by the signals received and prevents the signals received from being masked by the signals transmitted.

The receiver stage of the present embodiment includes a series connection of a memory circuit 100 for storing an echographic line (A-type) in a memory, a processing circuit 200 and a determination circuit 300 for determining the frequency-dependency. The memory circuit 100 successively includes an analog-to-digital converter 101 which is controlled by a clock circuit 125 which itself is controlled by the clock of the transmitter stage, and a digital memory 102. The processing circuit 220 includes two parallel-connected channels 210 and 220, each of which successively includes: a time selection circuit 212, 222, an arithmetic circuit 213, 223 for calculating the Fourier transform, an arithmetic circuit 214, 224 for calculating the square of the modulus for the calculation of the power spectrum, and a correction circuit for correcting the diffraction.

The time selection circuits 212 and 222 of the present embodiment are formed by multiplier circuits for multiplying the output signal of the memory 102 by a squarewave signal which forms a time slot whose position is determined by a selection circuit 201 for selecting the transit time, the transit time ($\tau_A$, $\tau_B$) thus selected in each of the two channels corresponding, for example, to the leading edge of the squarewave signal. The selection circuit 201 also calculates the ratio $\epsilon$ of the transit times associated with he two depths selected. The correction circuit for correcting the diffraction is formed by a dividing circuit 215, 225, a first input of which receives the output signal of the associated arithmetic circuit for calculating the square of the modulus, a second input thereof receiving a dividing signal which originates from a separate output of a memory 250 and which serves to correct the diffraction. The memroy 250 is controlled by a clock circuit 125 which is activated by the clock of the transmitter stage; the memory 250 is also connected to the output of the selection circuit 201 for selecting the transit time. This memory 250 is either a programmable read-only memory (PROM) or a random access memory (RAM) and is loaded as follows, regardless of whether the transducer is a focusing type or not. From the object to be examined there is selected a slice which is situated at the front of the object with respect to the device and at a distance z on the main axis of propagation, the intermediate object situated between the slice and the device being a medium having a low attenuation, for example water. Using a constant transmitted signal, the energy spectrum of the echographic signal is determined in this position; subsequently, this operation is repeated for the same distance z but for other positions which are reached by displacements perpendicularly to the main axis of propagation, so that a mean energy spectrum is obtained (for example, a mean spectrum is formed from 100 spectra around the same position). Subsequently, the mean energy spectrum is determined in the same way for other distances z between the device and the object to the examined, be it that always the same slice of the object is examined as a result of the time selection circuit which defines a time slot. Subsequently, for all successive positions along the axis z the correction values for the diffraction are calculated (the measurements performed eliminate any attenuation effect as a result of an appropriate choice of the intermediate object) and these values are written into the memory 250. In the case of a non-focusing transducer, the correction values can also be determined without utilizing a slice of the object to be examined, that is to say simply by using the, for example flat, reflective surface.

The outputs of the multiplier circuits 215 and 225 supply signals which are proportional to the above equations (7) and (8), respectively, and which are applied in parallel to the determination circuit 300 for determining the frequency-dependency. The determination circuit 300 first of all includes an arithmetic circuit 301 for calculating the equation (10) or (11), said circuit calculating the value T which is subsequently raised to the power $1/(2(\epsilon-1))$. The value of $\epsilon$ is applied to the arithmetic circuit 301 via a line from the selection circuit 201. The arithmetic circuit 301 is followed by a logarithmic amplifier 302 which supplies a signal which is proportional to $\log_{10} T^{1/(2(\epsilon-1))}$ and by a circuit 303 which stores the frequency-dependency of the scatter function in a memory and/or displays this function (see FIG. 2, in the logarithmic coordinates), display being realized by means of a display device 304. It will be apparent that in the device in accordance with the invention of an echographic line in a memory, the determination of the ratio of the spectra, and the display of the frequency dependency of the scatter function are repeated each time for two further observation depths which correspond to respective boundaries of homogeneous zones and also for further echographic lines.

What is claimed is:

1. A method of scanning an object by means of ultrasound echography which comprises the step of:
    (a) repeatedly transmitting ultrasound energy into an object;
    (b) receiving echoes from the object which correspond to reflections of the energy from obstacles at a plurality of separate observation depths in the object;
    (c) storing in a memory, signals which correspond to the echoes along an echographic line;
    (d) calculating a power spectrum for a pair of the stored signals which correspond to echoes received from separate observation depths in the object;
    (e) correcting the power spectra for effects of ultrasound diffraction; and
    (f) calculating and producing a signal which represents a ratio of the two power spectra.

2. The method of claim 1 further comprising the step of calculating and displaying a function of the ratio signal to produce an indication of a frequency dependency of an ultrasound scatter function in the object.

3. The method of claim 2 further comprising the step of storing the indication of the scatter function in a memory.

4. The method of claim 1 further comprising the step of repeating steps (c)–(f) using further echographic lines and further pairs of the stored signals.

5. A device for scanning objects by ultrasound echography comprising:
    ultrasound transmitting means for repeatedly transmitting ultrasound energy into an object;
    receiving means for receiving echoes of the ultrasound energy which are reflected by obstacles at a plurality of observation depths in the object and for producing electrical signals corresponding thereto;
    first memory means for storing signals from the receiving means which correspond to echoes along an echographic line in the object;
    means for receiving stored signals from the first memory means and which calculate a power spectra for a pair of signals which correspond to echoes from a first observation depth and a second observation depth in the object;
    correction means for correcting the calculated power spectra for the effects of ultrasound diffraction;
    arithmetic means for calculating an output function, T from said corrected spectra using the formula $$T = \left(\frac{a_1}{a_2}\right)^{2(\xi-1)} \cdot (f^{b_1-b_2})^{2(\xi-1)}$$

wherein $a_1$ and $b_1$ are the values of a coeffeicient a and an exponent b in a general formula $U(f) = Af^b$ of a scatter function for the object being scanned and wherein $a_2$ and $b_2$ are the values of said coefficient and exponent in said general function for a reference object in which the frequency-dependency of said scatter function is known and $\epsilon$ is a ratio of the two observation depths;
    a logarithmic amplifier which acts on the output function T of the arithmetic means;
    and means for calculating a frequency dependent scatter function from an output of said logarithmic amplifier.

6. The device of claim 5 further comprising means for storing the calculated scatter function in a second memory.

7. The device of claim 5 further comprising means for displaying the calculated scatter function.

8. The device of claim 5 wherein the calculated scatter function is $$\log_{10} T \frac{1}{2(\epsilon-1)}.$$

* * * * *